United States Patent
Yamauchi

(10) Patent No.: US 8,482,869 B2
(45) Date of Patent: Jul. 9, 2013

(54) LENS ACTUATOR AND CAMERA MODULE HAVING THE SAME

(75) Inventor: Yutaka Yamauchi, Suwon-si (KR)

(73) Assignee: Samsung Electro-Mechanics Co., Ltd. (KR)

( * ) Notice: Subject to any disclaimer, the term of this patent is extended or adjusted under 35 U.S.C. 154(b) by 0 days.

(21) Appl. No.: 13/198,509

(22) Filed: Aug. 4, 2011

(65) Prior Publication Data

US 2012/0120506 A1     May 17, 2012

(30) Foreign Application Priority Data

Nov. 12, 2010   (KR) .................. 10-2010-0112960

(51) Int. Cl.
*G02B 7/02*     (2006.01)
(52) U.S. Cl.
USPC .......................... 359/811; 359/819; 359/824
(58) Field of Classification Search
USPC ................... 359/694–704, 811–830
See application file for complete search history.

(56) References Cited

U.S. PATENT DOCUMENTS

| | | | | |
|---|---|---|---|---|
| 2003/0197960 A1* | 10/2003 | Harada | ........................ | 359/814 |
| 2008/0297650 A1* | 12/2008 | Son | ................. | 348/372 |
| 2012/0075730 A1* | 3/2012 | Dong | ........................... | 359/824 |

FOREIGN PATENT DOCUMENTS

| | | |
|---|---|---|
| JP | 2009-86548 A | 4/2009 |
| JP | 2009-237039 A | 10/2009 |
| KR | 10-2009-0046307 A | 5/2009 |
| KR | 10-2010-0062569 A | 6/2010 |

OTHER PUBLICATIONS

Korean Office Action mailed May 3, 2012, issued in corresponding Korean Patent Application No. 10-2010-0112960, filed Nov. 12, 2010, 4 pages.
Japanese Office Action mailed Oct. 16, 2012, issued in corresponding Japanese Application No. 2011-173820, filed Aug. 9, 2011, 3 pages.

* cited by examiner

*Primary Examiner* — Mohammed Hasan
(74) *Attorney, Agent, or Firm* — Christensen O'Connor Johnson Kindness PLLC

(57) ABSTRACT

Disclosed are a lens actuator and a camera module having the lens actuator. The lens actuator, which includes: a housing; a magnet installed in the housing; a lens holder supporting a lens and installed to ascend and descend in the housing; a spring coupled to the lens holder and supported by the housing to elastically support the lens holder; and a coil coupled to the lens holder in such a way that the coil faces the magnet, a lead line of the coil being interposed between the lens holder and the spring, forms an electric connection structure between the coil and the spring that durable against shocks and humidity, improving the reliability of electric connection, and simplifies the connection structure between the spring and the coil, making it easier to manufacture the lens actuator.

10 Claims, 3 Drawing Sheets

LENS ACTUATOR AND CAMERA MODULE HAVING THE SAME

CROSS-REFERENCE TO RELATED APPLICATIONS

This application claims the benefit of Korean Patent Application No. 10-2010-0112960, filed with the Korean Intellectual Property Office on Nov. 12, 2010, the disclosure of which is incorporated herein by reference in its entirety.

BACKGROUND

1. Technical Field

The present invention is related to a lens actuator and a camera module equipped with the lens actuator.

2. Background Art

A lens actuator that moves a lens is generally used for functions such as autofocus in a camera module.

One of the lens actuator types drives the lens by use of magnetic force, and this type of lens actuator often uses a spring that supports a lens holder as a medium for electric connection in order to supply electric current to a coil that generates the magnetic force.

Here, the coil and the spring are welded or coupled to each other by a conductive adhesive, but the reliability of adhesion may be low or deteriorated. Besides, since the structure of electric connection is complicated, production is also difficult.

SUMMARY

The present invention provides a lens actuator and a camera module equipped the lens actuator that can provide a reliable electric connection between a spring and a coil.

The present invention also provides a lens actuator and a camera module equipped with the lens actuator that can simplify the connection structure between a spring and a coil.

An aspect of the present invention features a lens actuator that includes: a housing; a magnet installed in the housing; a lens holder supporting a lens and installed to ascend and descend in the housing; a spring coupled to the lens holder and supported by the housing to elastically support the lens holder; and a coil coupled to the lens holder in such a way that the coil faces the magnet, a lead line of the coil being interposed between the lens holder and the spring.

The spring can be coupled to the lens holder by being elastically deformed to press down the lead line of the coil.

An assembly hole can be pierced and formed in the spring, and an assembly protrusion that is inserted and coupled through the assembly hole can be formed on the lens holder.

The assembly protrusion can include: a body being inserted in the assembly hole of the spring; and a head having a longest diameter that is greater than that of the assembly hole so that the spring is prevented from separation.

The assembly hole and the assembly protrusion can be in plurality, and the lead line of the coil can be disposed midway between the plurality of assembly protrusions.

The lens actuator can also include a connector that is coupled to the spring and configured to supply electricity that drives the coil.

Another aspect of the present invention features a camera module that includes: a housing; an image sensor disposed inside the housing; a lens configured to converge light to the image sensor; a lens holder supporting the lens and installed to ascend and descend in the housing; a spring coupled to the lens holder and supported by the housing to elastically support the lens holder; a magnet installed in the housing; and a coil coupled to the lens holder in such a way that the coil faces the magnet, a lead line of the coil being interposed between the lens holder and the spring.

The spring can be coupled to the lens holder by being elastically deformed to press down the lead line of the coil.

An assembly hole can be pierced and formed in the spring, and an assembly protrusion that is inserted and coupled through the assembly hole can be formed on the lens holder.

The assembly protrusion can include: a body being inserted in the assembly hole of the spring; and a head having a longest diameter that is greater than that of the assembly hole so that the spring is prevented from separation.

The assembly hole and the assembly protrusion can be in plurality, and the lead line of the coil can be disposed midway between the plurality of assembly protrusions.

The camera module can also include a connector that is coupled to the spring and configured to supply electricity that drives the coil.

DETAILED DESCRIPTION

Hereinafter, some embodiments of the present invention will be described in detail with reference to the accompanying drawings.

Figure 1:
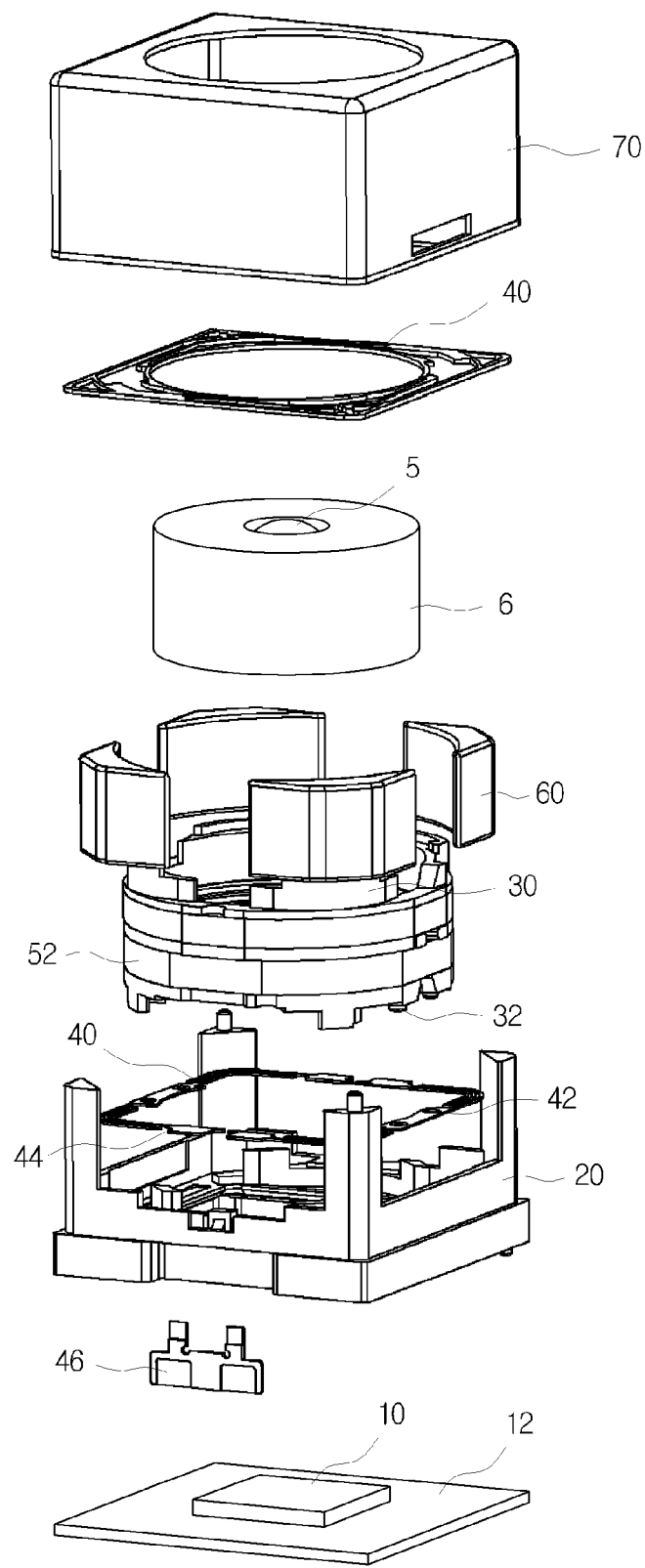
FIG. 1 is an exploded perspective view of a camera module in accordance with an embodiment of the present invention.

FIG. 1 is an exploded perspective view of a camera module in accordance with an embodiment of the present invention.

The camera module in accordance with an embodiment of the present invention includes an image sensor 10, a lens 5 and a lens actuator. The lens actuator of the present embodiment includes a housing 20, a magnet 60, a lens holder 30, a spring 40 and a coil 50.

The image sensor 10, which is a pickup device on which an image is formed by the light incident through the lens, is disposed on an optical axis of the lens 5 that is a moving path of the light.

As illustrated in FIG. 1, the image sensor 10 that is mounted on a board 12 is disposed inside the housing 20. However, the disposition of the image sensor 10 is not restricted to the above, and it is possible that the image sensor 10 is disposed in a variety of ways, such as being directly mounted inside the housing 20 or being disposed behind a through-hole of the board 12.

The housing 20 forms a space in which parts are installed. In the present embodiment, the image sensor 10 is disposed inside the housing 20, and the magnet 60 and the spring, which will be described later, are installed in the housing 20. In the present embodiment, a case 70, which covers the parts installed in the housing 20, can be coupled to the housing 20.

The lens holder 30, which supports the lens 5 so that the lens 5 can be disposed at a position that converges the light to the image sensor 10, is installed to ascend and descend in the housing 20 so that the distance between the lens 5 and the image sensor 10 can be adjusted. Accordingly, by controlling the ascent and descent of the lens holder 30, the camera module can realize the autofocus function.

As shown in FIG. 1, a lens barrel 6, in which the lens 5 is housed, is coupled to the lens holder 30. The lens holder 30 is then elastically supported by the spring 40, which will be described later, so that the lens holder 30 can move up and down in the housing 20.

The magnet 60 and the coil 50 generate the magnetic force that moves the lens holder 30.

In order to ascend and descend the lens holder 30 against the housing 20, the magnet 60 is installed in the housing 20, and the coil 50 is coupled to the lens holder 30 in such a way that the coil 50 faces the magnet 60. Accordingly, once the coil 50 is supplied with electric current, the electromagnetic force formed between the coil 50 and the magnet 60 moves the coil 50 and the lens holder 30, which is coupled to the coil 50.

As shown in FIG. 1, the coil 50 in accordance with the present embodiment is coupled to the lens holder 30 by being wound on an external circumferential surface of the lens holder 30, and the magnet 60 is disposed to surround the periphery of the lens holder 30 on which the coil 50 is wound.

The spring 40, which elastically supports the lens holder 30 to place the lens holder 30 at the initially-set position, is coupled to the lens holder 30 and is elastically supported by the housing 20.

As shown in FIG. 1, the lens holder 30 in accordance with the present embodiment is coupled with the spring 40 above and below the lens holder 30 so that the lens holder 30 can be supported to be ascended and descended.

Moreover, the spring 40 in accordance with the present embodiment functions to supply electricity to the coil 50. For this, the spring 40 is made of a conductive material and is electrically connected with a lead line 52 that is withdrawn from the coil 50 so that electric current is supplied to the coil 50.

Particularly, the lead line 52 of the coil 50 in the present embodiment is connected with the spring 40 by being interposed between the spring 40 and the lens holder 30. In other words, the lead line 52 is electrically connected with the spring 40 by the pressure of the spring 40, without any welding or adhesion. Accordingly, the connection structure of the spring 40 and the coil 50 is simplified, making it easier to manufacture the lens actuator. Besides, the structure of the lead line 52 pressed and fixed between the spring 40 and the lens holder 30 has the adhesive reliability that is little affected by external humidity and has the durability against a shock such as a drop.

Figure 2:
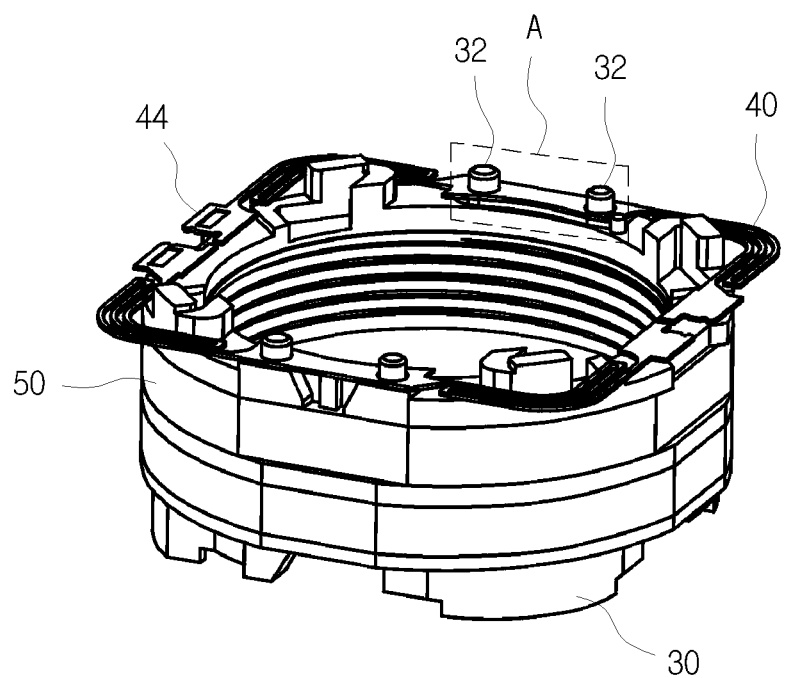
FIGS. 2 and 3 illustrate a connection structure of a spring and a coil in a camera module in accordance with an embodiment of the present invention.
Figure 3:
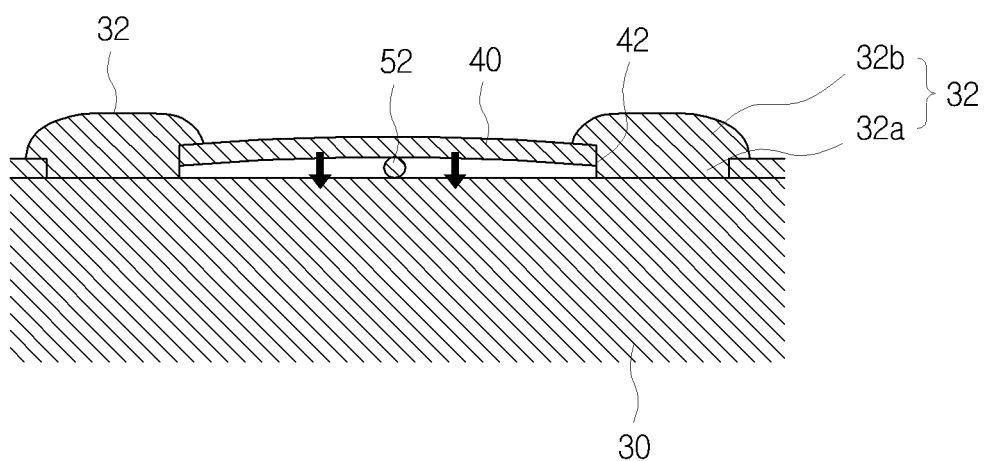

FIGS. 2 and 3 illustrate the connection structure of the spring 40 and the coil 50 in the camera module in accordance with an embodiment of the present invention. FIG. 3 is the cross-sectional view of a section marked by "A" in FIG. 2.

As illustrated in FIG. 3, in the present embodiment, a plate spring 40 is elastically deformed and coupled with the lens holder 30 so that the plate spring 40 can press down the lead line 52 of the coil 50.

Specifically, assembly holes 42 are pierced and formed in the spring 40, assembly protrusions 32, which are inserted and coupled through the assembly holes 42, are formed on the lens holder 30.

The assembly protrusion 32 is constituted by a body 32a, which is inserted into the assembly hole 42 of the spring 40, and a head 32b, which has a longest diameter that is greater than that of the assembly hole 42 so that the spring 40 can be prevented from separation. Accordingly, the assembly protrusion 32 can support the spring 40 in such a way that the spring 40 presses down the lead line 52 of the coil 50 interposed between the lens holder 30 and the spring 40.

Moreover, since the lead line 52 is disposed midway between the assembly protrusions 32, the spring 40 can apply uniform pressure to the lead line 52.

The spring 40 in accordance with the present embodiment can be connected by a connector 46, which supplies electricity that drives the coil 50 from the outside. As shown in FIGS. 1 and 2, the spring 40 in accordance with the present embodiment can have a pair of connector holes 44 formed therein, and a pair of electrodes of the connector 46 can be inserted and connected to the pair of connector holes 44.

Although certain embodiments of the present invention have been described, it shall be appreciated by anyone ordinarily skilled in the art to which the present invention pertains that there can be a variety of permutations and modifications of the present invention without departing from the technical ideas and scopes of the present invention that are disclosed in the claims appended below.

A large number of embodiments in addition to the above-described embodiments are present within the claims of the present invention.

What is claimed is:

1. A lens actuator, comprising:
   a housing;
   a magnet installed in the housing;
   a lens holder supporting a lens and installed to ascend and descend in the housing;
   a spring coupled to the lens holder and supported by the housing to elastically support the lens holder;
   a coil coupled to the lens holder in such a way that the coil faces the magnet, a lead line of the coil being interposed between the lens holder and the spring; and
   wherein the spring is coupled to the lens holder by being elastically deformed to press against the lead line of the coil without being otherwise physically connected to the lead line of the coil.

2. The lens actuator of claim 1, wherein an assembly hole is pierced and formed in the spring, and an assembly protrusion being inserted and coupled through the assembly hole is formed on the lens holder.

3. The lens actuator of claim 2, wherein the assembly protrusion comprises:
   a body being inserted in the assembly hole of the spring; and
   a head having a longest diameter that is greater than that of the assembly hole so that the spring is prevented from separation.

4. The lens actuator of claim 2, wherein the assembly hole and the assembly protrusion are in plurality, and the lead line of the coil is disposed midway between the plurality of assembly protrusions.

5. The lens actuator of claim 1, further comprising a connector coupled to the spring and configured to supply electricity that drives the coil.

6. A camera module, comprising:
   a housing;
   an image sensor disposed inside the housing;
   a lens configured to converge light to the image sensor;
   a lens holder supporting the lens and installed to ascend and descend in the housing;
   a spring coupled to the lens holder and supported by the housing to elastically support the lens holder;
   a magnet installed in the housing; and
   a coil coupled to the lens holder in such a way that the coil faces the magnet, a lead line of the coil being interposed between the lens holder and the spring; and
   wherein the spring is coupled to the lens holder by being elastically deformed to press against the lead line of the coil, without being otherwise physically connected to the lead line of the coil.

7. The camera module of claim 6, wherein an assembly hole is pierced and formed in the spring, and an assembly protrusion being inserted and coupled through the assembly hole is formed on the lens holder.

8. The camera module of claim 7, wherein the assembly protrusion comprises:
   a body being inserted in the assembly hole of the spring; and
   a head having a longest diameter that is greater than that of the assembly hole so that the spring is prevented from separation.

9. The camera module of claim 7, wherein the assembly hole and the assembly protrusion are in plurality, and the lead line of the coil is disposed midway between the plurality of assembly protrusions.

10. The camera module of claim 6, further comprising a connector coupled to the spring and configured to supply electricity that drives the coil.

* * * * *